United States Patent [19]
Yoder et al.

[11] Patent Number: 6,127,685
[45] Date of Patent: Oct. 3, 2000

[54] DOSIMETER DEVICE INCLUDING BODY LOCATOR INDICIA

[75] Inventors: R. Craig Yoder, Crete, Ill.; Robert M. Greaney, Crown Point, Ind.

[73] Assignee: Landauer, Inc., Glenwood, Ill.

[21] Appl. No.: 09/099,685

[22] Filed: Jun. 18, 1998

Related U.S. Application Data

[60] Provisional application No. 60/051,028, Jun. 27, 1997, and provisional application No. 60/051,171, Jun. 27, 1997.

[51] Int. Cl.⁷ ....................................................... G01T 1/11
[52] U.S. Cl. .................................. 250/472.1; 250/475.2; 250/482.1; 250/337
[58] Field of Search .............................. 250/472.1, 475.2, 250/482.1, 483.1, 337

[56] References Cited

U.S. PATENT DOCUMENTS

| | | |
|---|---|---|
| 2,161,644 | 6/1939 | Van Der Grinten . |
| 2,753,460 | 7/1956 | Reed et al. . |
| 2,902,602 | 9/1959 | Chassende-Baroz . |
| 2,938,121 | 5/1960 | Fitzgerald et al. . |
| 3,604,931 | 9/1971 | Kastner et al. . |
| 3,652,854 | 3/1972 | Wheeler .......................... 250/484.3 |
| 4,056,729 | 11/1977 | Collica et al. . |
| 4,130,760 | 12/1978 | Fanselow et al. . |
| 4,847,503 | 7/1989 | Tetley et al. . |
| 4,954,716 | 9/1990 | Wheeler . |
| 4,999,503 | 3/1991 | Andru . |
| 5,084,623 | 1/1992 | Lewis et al. . |
| 5,099,132 | 3/1992 | Ueno et al. . |
| 5,179,281 | 1/1993 | Tawil et al. . |
| 5,262,649 | 11/1993 | Antonuk et al. . |

OTHER PUBLICATIONS

PCT Search Report of corresponding PCT application No. PCT/US98/12626.

*Primary Examiner*—Constantine Hannaher
*Assistant Examiner*—Otilia Gabor
*Attorney, Agent, or Firm*—Trexler, Bushnell, Giangiorgi & Blackstone, Ltd.

[57] ABSTRACT

Disclosed is a dosimeter badge that includes body locator indicia consisting of an icon representing a portion of a human body and indicia, such as a dot, associated therewith to indicate where, on the body, the badge should be worn. This information as to the desired location wherein the badge has been or will be worn is included in the identifying indicia printed on the dosimeter badge. A preferred form of dosimeter badge includes a flat member separated into panels along fold lines.

26 Claims, 3 Drawing Sheets

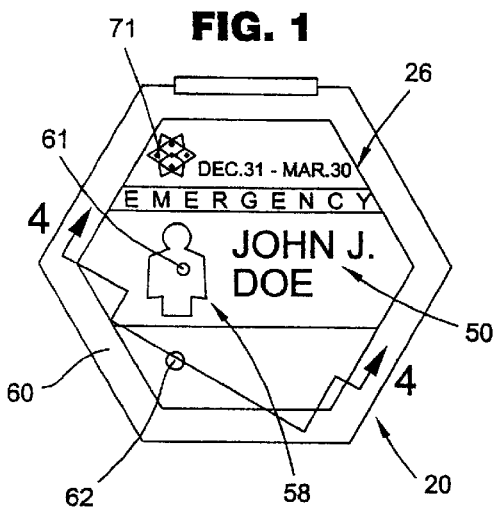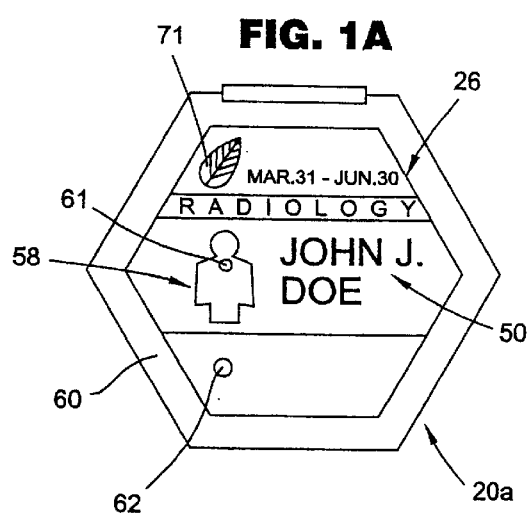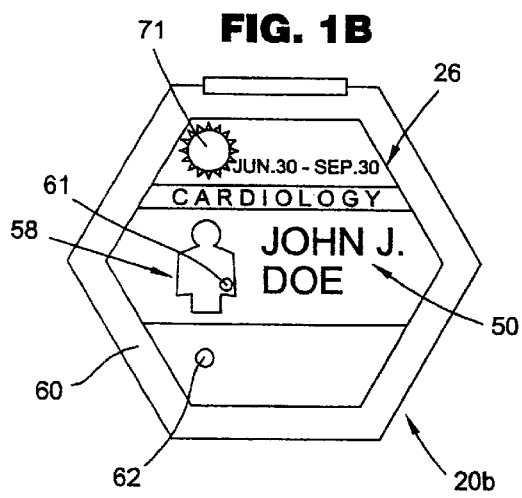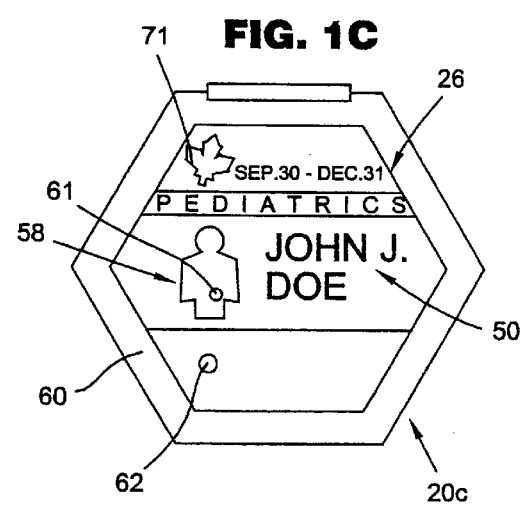

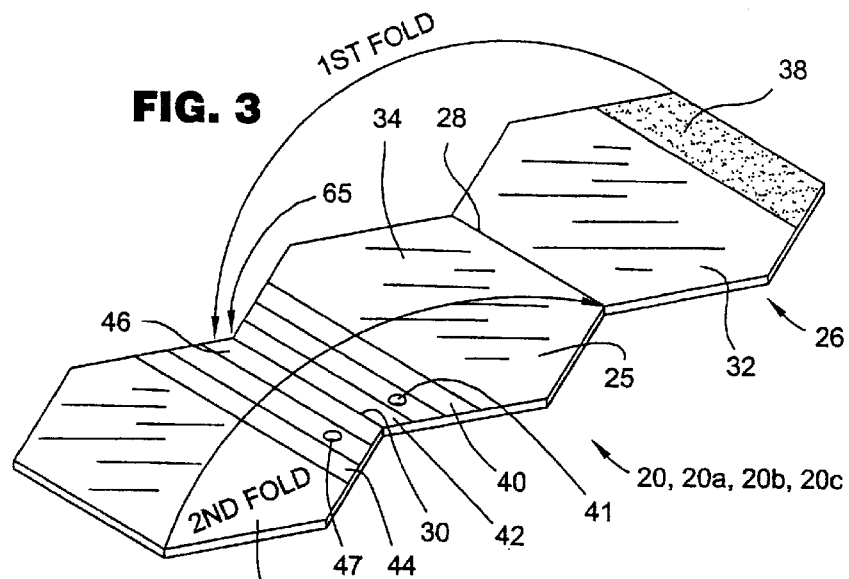
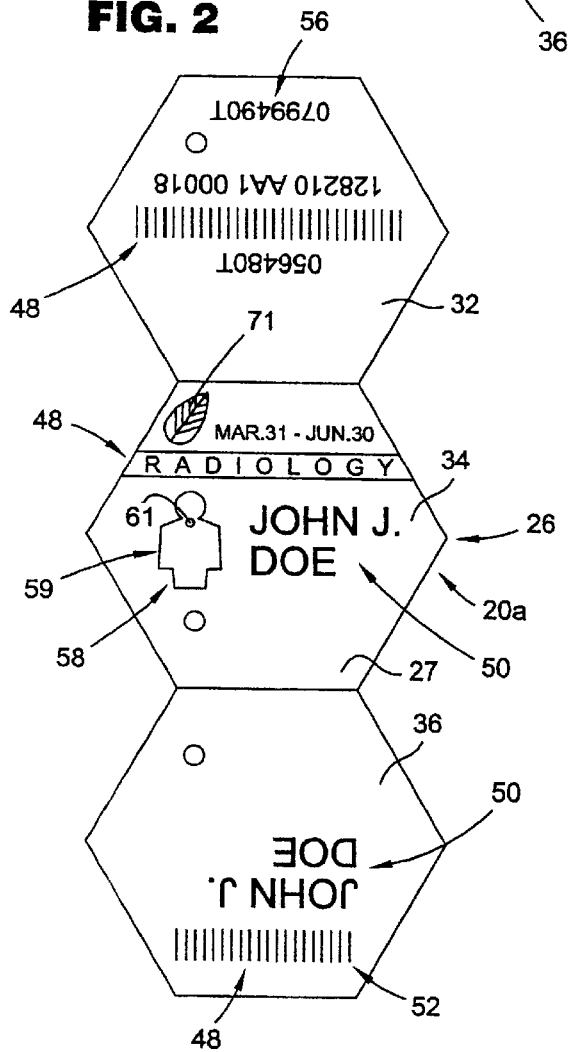
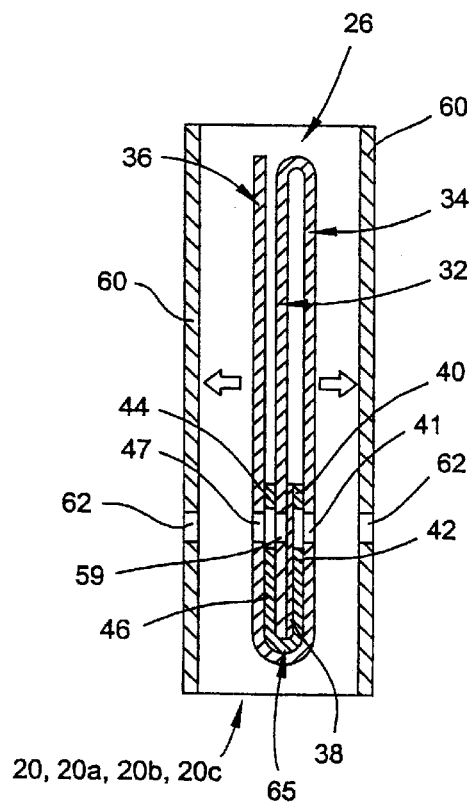

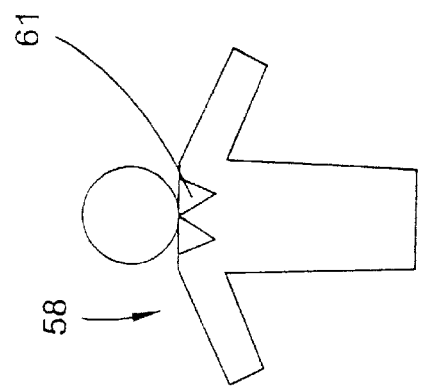
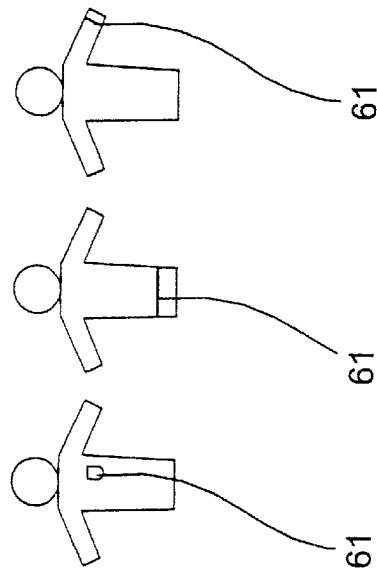
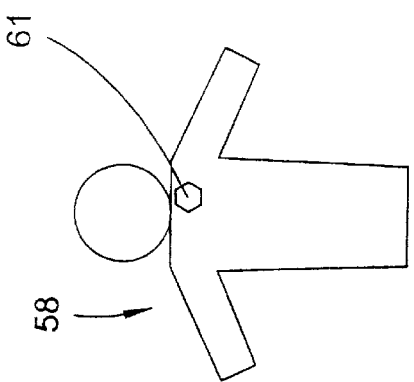
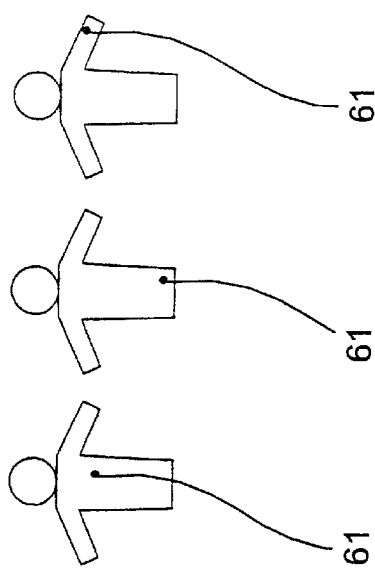
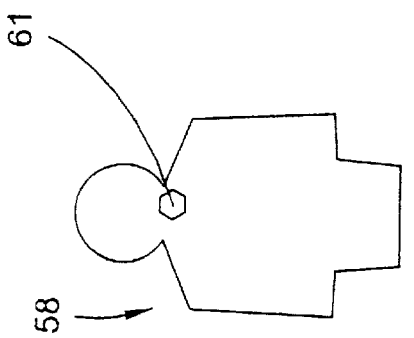
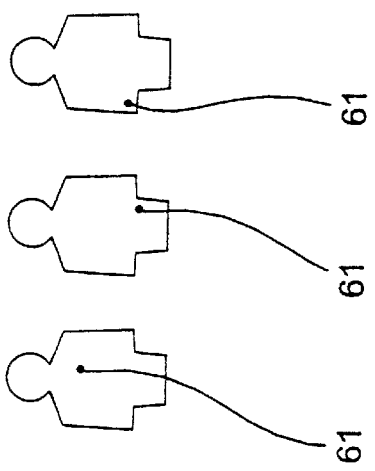
FIG. 5

6,127,685

DOSIMETER DEVICE INCLUDING BODY LOCATOR INDICIA

RELATED APPLICATIONS

This application claims the benefit of U.S. Provisional Application Nos. 60/051,028 and 60/051,171, both filed on Jun. 27, 1997.

BACKGROUND

The present invention relates generally to dosimeter badges, and relates more specifically to a novel dosimeter badge including body locator indicia.

Exposure to an excessive level of radiation can be extremely harmful, as such, many employers whose employees must work in a radioactive environment, such as nuclear power plant operators, utilize a program whereby the employees are required to wear one or more dosimeter badges while they work. After a period of time, the dosimeter badges are collected and analyzed to determine the extent of radiation exposure to which each employee has been subject. Thereafter, corrective measures can be taken to diminish the risk of any particular employee of overexposure to radiation.

Preferably, each employee wears one or more dosimeter badges on specific locations of the body. For example, an employee may wear one dosimeter badge on the neck, another on the chest, and still yet others on each of the belt, sleeve and hat. By having an employee wear numerous dosimeter badges at varying locations of the body, it is possible to obtain more specific information about radiation exposure with respect to that employee. For example, should the dosimeter badge on the head indicate an overexposure to radiation, this may indicate that the exposure is resulting from faulty overhead piping carrying radioactive material.

State and Federal Regulations specify different radiation exposure limits for different regions of the body, thus it is important that the badges be worn at the proper location. Should the employee wear a dosimeter badge which is coded for a specific location at a wrong or improper location of the body (e.g., wears the dosimeter badge coded for the head on the sleeve and wears the dosimeter badge for the sleeve on the head) incorrect information will be obtained, and a correlation of the dosage from one monitoring period to another will be incorrectly determined. As a result, it is imperative that the coded dosimeter badges be worn on the correct locations of the body in order to obtain a proper survey of the employees exposure and to be able to take effective corrective action to eliminate future overexposure to radiation.

As mentioned, after a period of time, the dosimeter badges are collected to be analyzed. At this time, new dosimeter badges are typically distributed to the employees to continue monitoring exposure to radiation in the workplace. Should one or more employees fail to exchange their dosimeter badges, and continue wearing their old badges into the next monitoring cycle, it becomes more difficult to pinpoint exactly when overexposure to radiation has occurred.

Presently, there are four methods of dosimetry which are generally used to monitor the extent of exposure to radiation. The first method is the use of radiological monitoring film. Radiological film has been used to monitor radioactive exposure in the workplace for over seventy years. In fact, this method remains the most widely used in the world. Essentially, when radiological film is used, each worker is required to wear one or more dosimeter badges in each of which sits radiological film. After a period of time, the badges are collected and analyzed to determine the amount of radioactive exposure.

As radiation passes through a dosimeter badge, filters in the badge filter the radiation in order to produce a multiple-density image on the radiological film. This multiple-density image is analyzed and provides, essentially, a quantitative and visual record of both the amount of exposure, and the conditions that existed during the exposure. For example, the greater the density or film darkening on the radiological film, the greater the dose of radiation to which the radiological film was exposed. Additionally, the angularization of the image formed indicates direction of the exposure or movement or lack thereof, during exposure. For example, a sharp image formed on the radiological film indicates that the exposure to radiation was static; such as would be the case if the dosimeter badge were left in an x-ray examination room. In contrast, a blurred image formed on the radiological film indicates that the dosimeter badge was moving during the exposure to radiation. Other characteristics of the image formed on the radiological film may indicate that the dosimeter badge was incorrectly worn, or that the film had been contaminated.

The image formed on the radiological film not only provides a visual record of the exposure, but because of the nature of radiological film, provides a permanent record of the exposure that can be re-evaluated should the need arise. While radiological film cannot be reused, it is usually more desirable to store the film in order to maintain a permanent record of the exposure. Typically, each radiological film includes embossed characters or coded perforations thereon which allow each film to be identified in terms of who wore the dosimeter badge in which that particular film was contained, and during what specific period of time.

While radiological film is relatively inexpensive due to economies of scale, radiological film presents certain disadvantages. For example, elaborate packaging must be used to protect the emulsion on the film from light, humidity and handling damage. This is because light, humidity, heat and pressure may induce the film to darken, and this film darkening can be mistaken for exposure to radiation. Furthermore, radiological film can be used only to monitor radiation exposure within a specific, limited range. Additionally, developing the film presents a laboratory inconvenience. Unfortunately, automated processors typically found in hospitals cannot be used to develop the film because hospital units are designed for larger film and rapid processing. Developing the film requires close monitoring of chemical strength and temperature, as well as developing time. For these reasons, developing the film and analyzing the image thereon is generally left to large commercial monitoring services which can employ advanced quality control methods, and which can benefit from economies of scale.

A common badge in which radiological film is inserted is a badge which includes a plastic film-holding member having a slot thereon for receiving the film. Adjacent to and surrounding the slot are two U-shaped, usually metal, filters, wherein each U-shaped filter is formed of a different metal having a different atomic number. Additionally, the plastic film-holding member typically has an aperture therein that leads to the film-receiving slot, and therefore to the film. Each of the U-shaped filters and the aperture are located adjacent to different portions of the film when the film is inserted in the slot. This configuration of the dosimeter badge provides essentially four different filters adjacent to the film for filtering radiation that passes through the badge. Specifically, a first filter of metal, a second filter of another type of metal, a third filter of plastic (provided by the plastic film-holding member itself), and a fourth "filter", a non-filter, formed by the aperture adjacent the slot. As a result of the four filters, a multiple-density, or "shaped", image is formed on the film when radiation passes through the badge. Subsequently, this multiple-density image can be analyzed to determine the exposure to radiation.

Unfortunately, the above-described badge used in connection with radiological film is bulky and can only be used in connection with film. The badge cannot be used in connection with the other methods of dosimetry which will be described. Additionally, the construction of the badge is such that the film is inserted into the plastic film-holding member as a secondary operation, normally by hand. Furthermore, the film must be removed from the badge in order to analyze the image formed thereon, and this requires yet another operation. Still further, the badges typically offer no indication of where, on the body, the badges should be worn. Prior art badges may have wear dates, however, these are not easily ascertainable especially from a distance. As such, one wearing an out-of-date badge would not stand out in a group. Sometimes the badges are produced in different colors to attempt to indicate to the employee where, on the body, the badges should be worn and when the badges should be exchanged. Unfortunately, this requires the employee to learn to associate either a certain dosimeter badge shape or color with a specific location on the body or specific time period, and it becomes easy for the employee to mistakenly put a dosimeter badge on the wrong body part or wear a dosimeter badge into the next monitoring cycle. Furthermore, having to make dosimeter badges in different colors and shapes provides that the badges cannot be as effectively mass produced.

The remaining methods of dosimetry utilize special crystals doped with impurities which trap energy deposited by radiation. When these special crystals are used to monitor exposure to radiation in the workplace, each worker is required to wear one or more dosimeter badges in each of which sits a plurality, such as four, of the crystals. As radiation passes through a badge, four filters, one associated with each of the four crystals, filter the radiation as the radiation deposits energy in each of the four crystals. After some period of time, the dosimeter badges are collected, and the crystals are analyzed to determine the extent of exposure to radiation.

Within one method of dosimetry, the crystals are analyzed by heating them to high temperatures, such as from 250° to 300° Celsius, causing the energy trapped in the crystals to be released as luminescence. The amount of luminesce is proportional to the extent of radiation exposure. Therefore, analyzing the amount of luminescence provides that the amount of exposure to radiation can be determined. This method of dosimetry has come to be called thermoluminescence dosimetry (TLD).

Within another method of dosimetry, optical energy is used instead of thermal energy, and specifically laser energy is used to produce the luminescence in the crystals after exposure to radiation. This method of dosimetry has come to be called optically stimulated luminescence (OSL).

Within yet another method of dosimetry, the crystals are cooled with liquid nitrogen, and then stimulated with light. Then, the crystals are allowed to warm to room temperature. During warming, the crystals luminesce in proportion to the amount of energy deposited during exposure to radiation. Therefore, analyzing the luminescence can allow one to determine the extent of exposure to radiation. This method of dosimetry has come to be called cooled optically stimulated luminescence (COSL).

The nature of the special crystals used within the second, third and fourth above-described methods of dosimetry provide certain advantages over radiological film. For example, the measurement range of the crystals greatly exceeds that of film, and the crystals better simulate human tissue than does film. Additionally, the crystals are less susceptible to physical damage. Furthermore, the crystals avoid the chemical developing process required by radiological film, and can be analyzed using a small, highly automated reader.

Unfortunately, the nature of the crystals also offer some disadvantages compared to film. For example, unlike film, the crystals cannot provide any indication of the exposure conditions. Also, indicia generally cannot be provided on the crystal itself to provide an indication of who wore the badge containing the crystal and during what period of time. Instead, each crystal must be identified by its position in a card or plate that has a unique identification number thereon. This provides room for error.

Furthermore, TLD specifically offers additional disadvantages. While the heating of the crystals provide that they can be reused because the dosimetry traps therein are cleared, the clearing of the dosimetry traps provides that the crystals cannot be re-evaluated. Therefore, TLD does not offer the same permanent record of the radiation exposure as does radiological film or the crystals when analyzed using either the OSL or COSL dosimetry methods.

A common dosimeter badge in which the special crystals are inserted is a badge which includes a plastic member that has a slot for receiving a plastic card carrying the four crystals. Once the card is inserted in the slot, a different filter is aligned with each crystal. A first filter is formed by two metal discs, each comprised of a specific type of metal, and each located on opposing sides of one crystal. A second filter resembles the first, but the discs are formed of a different type of metal, and are aligned with another crystal. A third filter is formed by the plastic member itself, and a fourth "filter", essentially a non-filter, is formed by opposing apertures in the plastic member. After exposure to radiation, the plastic card can be removed from the plastic member, and the crystals can be analyzed using one of the above-described three methods, namely TLD, OSL or COSL. Should TLD be utilized, the crystals need to be removed from the plastic card before being subjected to the extreme heat required to perform the analysis.

Unfortunately, the above-described dosimeter badge which is used in connection with the crystals and the TLD, OSL and COSL dosimetry methods cannot also be used with radiological film. Additionally, the badge is bulky, and requires the secondary operation of inserting the plastic card in the plastic member, and the subsequent operation of removing the plastic card to analyze the crystals. Additionally, should the TLD dosimetry method be utilized, the crystals must be removed from the plastic card before heating, and the crystals must subsequently be reassociated with some external indicia to identify who wore the corresponding badge and during what particular time period. Obviously, this presents a chance for error. Furthermore, the badges typically provide no indication, other than the color or shape of the badges, to the employee as to where, on the body, each badge should be worn or when the badge should be exchanged. As already discussed, this presents specific disadvantages.

The present invention will be disclosed hereinafter with respect to a particular novel dosimeter construction, which is the subject matter of a companion application filed by Applicant herein, on Apr. 15, 1998, Ser. No. 09/061,539, the content of which is incorporated herein by reference. While the present invention is especially suited for use on this type of badge due to the fabrication thereof from flat stock and the use of modem computer printing methods to code or place identifying indicia on said dosimeter badge, the concept can be used with other dosimeter badge constructions, including those known in the prior art, or hereinafter developed.

While the present invention is not specifically directed to solve all the problems associated with each of the four existing dosimetry methods, the present invention is directed to solve most of the problems encountered heretofore with respect to the badges which have been used in connection therewith. Specifically, the present invention is directed to provide indicia on a dosimeter badge for indicating where, on the body, the badge should be worn.

OBJECTS AND SUMMARY OF THE DISCLOSURE

A general object of the present invention is to provide a dosimeter device, or badge, that includes an icon representing a human body, and indicia associated with the icon for identifying where, on the human body, the device should be worn.

Another object of the present invention is to provide a dosimeter device, or badge, which indicates where, on the body, the device should be worn, and which can be used in connection with any of the commonly used methods of dosimetry.

Still another object of the present invention is to provide a dosimeter device, or badge, that is streamlined, being relatively small, light and thin, and which provides an indication of where, on the body, the device should be worn.

Yet another object of the present invention is to provide a dosimeter device, or is badge that is inexpensive to produce within a relatively simple, continuous method and which provides an indication of where, on the body, the device should be worn.

Yet still another object of the present invention is to provide a dosimeter device, or badge, that is an integrated device that provides an indication of where, on the body, the device should be worn.

A further object of the present invention is to provide a dosimeter device, or badge, where a radiation sensitive member is essentially integral with identifying indicia and where the device provides an indication of where, on the body, the device should be worn.

Still a further object of the present invention is to provide a dosimeter device, or badge, which can be quickly produced several at a time and which provides an indication of where, on the body, the device should be worn.

A still yet further object of the present invention is to provide a dosimeter device, or badge, that includes indicia representing seasons of the year for identifying a particular time period in which the device should be worn.

A still further object of the present invention is to provide a dosimeter badge, or device, which provides an indication of where, on the body, the device should be worn, and which can be produced using, essentially, a printing method.

Briefly, and in accordance with the above, the present invention envisions a dosimeter device which includes an icon representing a human body, and which includes indicia associated with the icon for identifying where, on the human body, the device should be worn.

An illustrated embodiment of the present invention is a dosimeter device that includes a flat member, which is formed or separated into three panels along two fold lines. A first panel is provided which has the radiation sensitive element thereon. This is joined to a second panel which has two attenuators thereon, a first attenuator formed of a first material and a second attenuator formed of a second material. The second panel also has a window or opening formed thereon. A third panel also has two additional attenuators thereon, a third attenuator formed of the same material as the first attenuator on the second panel and a fourth attenuator formed of the same material as the second attenuator on the second panel. The panels are separated by fold lines, and the third panel has a window formed thereon. When the flat member is folded along the first and second fold lines, the first panel becomes sandwiched between the third and second panels, and the first and third attenuators oppose each other with the radiation sensitive member sandwiched therebetween. Likewise, the second and fourth attenuators oppose each other with the radiation sensitive member sandwiched therebetween. Additionally, the windows on the third and second panels oppose each other with the radiation member sandwiched therebetween. An icon representing a human body is provided on the second panel, and indicia associated with the icon is provided to indicate where, on the human body, the device should be worn. Additionally, indicia representing a monitoring period, as for example, the seasons of the year is provided on the second panel for identifying the time period in which the device should be worn. This may also be done by varying colors. It is emphasized that while the invention is being illustrated with a novel tri-fold dosimeter fabricated from flat stock material, the icon identification system may be used with dosimeters of varying construction.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIGS. 1, 1A, 1B and 1C are views of assembled dosimeter badges in accordance with the present invention;

FIG. 2 is a view of a preferred form of dosimeter badge of FIG. 1A showing the dosimeter badge unfolded and separated from a protective attenuator or outer plastic cover;

FIG. 3 is a view applicable to any of the badges described herein of the flip-side of the side of the unfolded dosimeter badge shown in FIG. 2, showing the folding over of one panel onto another, and showing the placement of the attenuators and the radiation sensitive element as the flat stock material;

FIG. 4 is a cross-sectional view of any of the dosimeter badges of FIGS. 1, 1A, 1B or 1C, shown along a staggered line 4—4 of FIG. 1; and FIG. 5 is a view showing several different icons and associated indicia which can be used with a dosimeter badge in accordance with the present invention.

DESCRIPTION

Shown in the FIGS. 1–4 are dosimeter badges in accordance with the present invention. Shown in FIG. 1 is a dosimeter badge 20 designed to be worn on the chest of an individual. Shown in FIGS. 1A and 2 is a dosimeter badge 20a designed to be worn on the neck. FIG. 1B shows a dosimeter badge 20b designed to be worn on the sleeve, and FIG. 1C shows a dosimeter badge 20c designed to be worn on the belt.

As shown in FIG. 3, each of the dosimeter badges 20, 20a, 20b, and 20c includes a foldable, flat member 26. FIG. 3 shows one side 25 of an unfolded dosimeter badge, and the view shown in FIG. 3 is applicable to any of the dosimeter badges 20, 20a, 20b and 20c of FIGS. 1, 1A, 1B and 1C, respectively, because this side 25 of the badges and the components thereon do not vary from one badge to another. That is to say, each badge will include, in addition to the identifying indicia of FIG. 2, a radiation sensitive element and various filters or attenuators, as described hereinafter. FIG. 2 shows the flip-side 27 of the side 25 shown in FIG. 3, but is specifically related to the dosimeter badge 20a shown in FIG. 1A. However, the flip side of the other dosimeter badges is similar except that it is coded in accordance with the indicia on an icon representing a different location on which to wear the particular badge. This feature will be described later hereinbelow. Now, the general structure of the dosimeter badge 20a shown in FIG. 1A will be described with the understanding that the other badges 20, 20b and 20c are identical except for the mentioned indicia, and also the dosimeter of differing construction may be employed.

As shown in FIG. 3, each of the dosimeter badges 20, 20a, 20b and 20c is formed of a flat member 26, such as paper stock, and is foldable along two fold lines 28 and 30. As shown, the fold lines 28 and 30 separate the flat member 26 into, essentially, three panels 32, 34 and 36. The first fold line 28 divides the first panel 32 from the second panel 34, and the second fold line 30 divides the second panel 34 from the third panel 36.

On the first side 25 of the flat member 26, on the first panel 32, is a radiation sensitive member 38 formed of, for example, as a label or printed thereon as an ink or a slurry. While it is preferred that the radiation sensitive member 38 be comprised of aluminum oxide (sapphire) powder dispersed in a binder and that the radiation sensitive member 38 be later analyzed using OSL dosimetry technology, it should be recognized that the radiation sensitive member 38 may be comprised of essentially any material which is sensitive to radiation in a manner by which information can be determined by analyzing the radiation sensitive member 38 using any dosimetry method, such as TLD, OSL or COSL. To this end, the radiation sensitive member 38 may comprise one or more crystals mounted to a substrate. Alternatively, the radiation sensitive member 38 may be radiological film. One having ordinary skill in the art would recognize that the radiation sensitive member 38 need not be provided on the flat member 26 in the specific location shown in FIG. 3, so long as the location of the radiation sensitive member 38 is consistent with the objectives of the present invention, namely, obtaining information regarding exposure of the badge to radiation. Further, it is not imperative that the radiation sensitive member 38 be provided in the specific shape depicted.

Also on the first side 25 of the flat member 26, on the second panel 34 is a first attenuator 40, a second attenuator 42 spaced apart from the first attenuator 40 and a window or opening 41 on the second panel 34. Each of the attenuators, 40 and 42, may be comprised of essentially any material which provides desirable radiation filtering qualities. For example, each of the attenuators 40,42 may consist of a metal foil or a plastic material with a metal oxide imbedded therein. Alternatively, the attenuators 40,42 may be some type of ink or paste with one or more metals disposed within the matrix thereof. Regardless, preferably the first attenuator 40 and the second attenuator 42 provide distinctive radiation filtering qualities so that the distinction provides a "shaping" of radiation absorbed by the radiation sensitive member 38 when the badge is exposed thereto. For example, the first attenuator 40/second attenuator 42 may be copper/ aluminum, aluminum/lead, or titanium/antimony.

Much like the second panel 34, the third panel 36 has preferably two attenuators 44 and 46 thereon, and a window or opening 47 formed therein. Preferably, the third attenuator 44 has radiation filtering properties similar to that of the first attenuator 40 on the first panel 32. Similarly, preferably the fourth attenuator 46 has radiation filtering properties similar to that of the second attenuator 42 on the first panel 32. To this end, each of the first and third attenuators, 40 and 44 are preferably comprised of the same material as the second and fourth attenuators, 42 and 46, respectively.

One having ordinary skill in the art would recognize that the attenuators, 40, 42, 44 and 46 need not be shaped as is depicted in the Figures, and need not be located in the specific location shown, so long as the shape and location are consistent with the objectives of providing the attenuators in accordance with the present invention. For example, the first and second attenuators 40 and 42 can be provided under the radiation sensitive member 38 on the first panel 32, and the third and fourth attenuators 44 and 46 can be provided on the second panel 34. In this case, the third panel 36 can be eliminated, the unit in a sense being of a bi-fold design. Or, as shown, the second and fourth attenuators 42 and 46 can be provided essentially, as a single attenuator 65 which spans the fold line.

The second side 27 of the flat member 26 is shown in FIG. 2. As mentioned, while FIG. 2 is specific to the badge 20a shown in FIG. 1A, the flip-side of the other badges are similar except they are coded for the indicia on the icon depicting a different area of the body on which to wear the badge, and except for indicia indicating a different monitoring period or season of the year in which to wear the badge. As shown in FIG. 2, a window or opening 59 can also be provided on the first panel 32, adjacent the radiation sensitive member 38. Preferably identifying indicia 48 is provided on the badge. For example, name-identifying indicia 50 may be provided thereon, such as on the first and second panels, 32 and 34, and bar code indicia 52 may be provided thereon, such as on the first and third panels, 32 and 36. Other indicia 48 may also be provided thereon, such as date-identifying indicia and serial number indicia 56 on the third panel 36, as well as other 2D symbologies.

Of extreme importance is that badge-placement indicia 58 be provided on the properly coded badge, that is that the indicia 52 be correlated to the location identified by the icon. Specifically, an icon 59 representing a portion of a human body is provided along with indicia 61, such as a dot, for identifying the location on which to wear the badge 20 in accordance with the code or indicia 52. Examples include those of FIGS. 1, 1A, 1B, 1C and 1D as well as those shown in FIG. 5. For example, the indicia 61 of FIG. 1 indicates that the badge 20 should be worn on the chest. The indicia 61 of FIG. 1A indicates the badge 20a should be worn on the neck, the indicia 61 of FIG. 1B indicates the badge 20b should be worn on the sleeve or wrist, and the indicia 61 of FIG. 1C indicates the badge 20c should be worn on the belt or waist area. Several other examples are shown in FIG. 5, and are self-explanatory.

Additionally, as shown in FIGS. 1, 1A, 1B and 1C, monitoring cycle indicia 71 is provided on the badges 20, 20a, 20b and 20c. The monitoring cycle indicia 71 indicates the particular period of time during which the badge should be worn. For example, a leaf can be provided to indicate the fall season, a snowflake can be provided to indicate the winter season, etc.

As mentioned, the first panel 32 and the second panel 34 of the badge 20, 20a, 20b or 20c are separated by the first fold line 28 on the flat member 26, and the second and third panels, 34 and 36, are separated by the second fold line 30 on the flat member 26. As shown in FIG. 3, the flat member 26 is foldable along the fold lines 28 and 30 such that the first panel 32 can be folded onto the second panel 34, and the second panel 34 folded onto the third panel 36. The folded flat member 26 may then be surrounded by a protective attenuator 60, such as plastic. Preferably, the protective attenuator 60 protects the folded flat member 26 and provides radiation filtering qualities which are distinct from those of the attenuators 40, 42, 44 and 46 provided on the flat member 26 such that the distinction provides further "shaping" of the information to be gained from subsequently analyzing the radiation sensitive member 38 after exposure to radiation. As shown in FIGS. 1, 1A, 1B, 1C and 4, preferably the protective attenuator 60 has windows 62 formed therein which align with the windows 41, 47 and 59 in the flat member 26 when the flat member 26 is folded. After the flat member 26 has been folded and surrounded by the protective attenuator 60, the badge looks as shown in FIGS. 1, 1A, 1B or 1C.

FIG. 4 is a cross-sectional view of any of the badges shown in FIGS. 1, 1A, 1B or 1C, taken along line 4—4 of any of those Figures. FIG. 4 is not shown to scale, and is enlarged to show detail and to facilitate description thereof. In addition, the spacing between the layers is exaggerated for purposes of illustration. In practice, the layers will be in closely, overlying juxtaposition. For example, the protective attenuator 60 is shown spaced relatively far apart from the folded flat member 26 for clarity. As shown in FIG. 4, when the flat member 26 is folded, preferably the first and third attenuators, 40 and 44, become aligned with each other with the radiation sensitive member 38 essentially sandwiched therebetween. Likewise, preferably the second and fourth attenuators, 42 and 46, become aligned with each other with the radiation sensitive member 38 essentially sandwiched therebetween. Additionally, preferably the windows 41, 47 and 59 on the panels 34, 36 and 32, respectively, also become aligned with each other, and also become aligned with windows 62 on the protective attenuator 60 with the radiation sensitive member 38 essentially sandwiched therebetween. In this manner, a plurality of filters are provided for filtering radiation as the radiation flows through the badge. Specifically, the first and third attenuators 40 and 44 provide a first filter for filtering radiation before the radiation contacts the radiation sensitive member 38, and second and fourth attenuators 42 and 46 provide a second filter for filtering radiation before the radiation contacts the radiation sensitive member 38. Additionally, the protective attenuator 60 provides a third filter, and the windows 41, 47, 59 and 62 provide a fourth "filter", essentially a non-filter. As a result, the information to be acquired by analyzing the radiation sensitive member 38 after being exposed to radioactivity is "shaped". As a result, more reliable data can be achieved from the analysis.

By providing an icon representing a portion of a human body and indicia 61 associated therewith to indicate where, on the body, the badge should be worn, the risk that the badge will be worn on the wrong location of the body is greatly reduced. Additionally, by providing monitoring cycle indicia on the badge, the risk that an employee will mistakenly wear the badge into the next monitoring cycle is greatly reduced. Finally, the badge disclosed herein is very light and streamlined, and can be used with any of the commonly used dosimetry methods. Also, it must be noted that the identical location for placement of the badge, indicia 61, is coordinated with the identifying indica 52, which will also identify the area or location wherein the badge has been worn. Thus, when the badge is analyzed, there is provided information not only as to the amount of radiation, but also the location where the badge has been worn. This information can provide a more accurate profile of the nature, location, etc., of radioactive exposure to which an employee has been exposed. Further, this information can be primarily associated with the radiation sensitive element 38, by the indicia printed on the opposite side of the associated panel 32—compare FIGS. 2 and 3.

To produce any of the badges 20, 20a, 20b or 20c described and depicted herein, the method disclosed in the U.S. patent application entitled "Dosimeter Device and Method of Producing Same", Ser. No. 09/061,539, filed on Apr. 15, 1998, can be utilized, and the disclosure of that patent application has been incorporated herein by reference.

What is claimed is:

1. A dosimeter device wearable on the human body to indicate exposure to radiation, said device comprising: a radiation sensitive member within said device for indicating exposure to radiation; and indicia on an external surface of said device, said indicia identifying where on the human body the device should be worn said indicia comprising an icon representing a human body, and indicia positioned with respect to said icon for identifying where on the human body the dosimeter device should be worn.

2. A dosimeter device as recited in claim 1, further comprising monitoring cycle indicia identifying a period of time during which the dosimeter device should be worn.

3. A dosimeter device as recited in claim 2, said monitoring cycle indicia identifying one of four seasons in a year.

4. A dosimeter device as recited in claim 1, farther comprising bar-code indicia on an external surface of said dosimeter device.

5. A dosimeter device as recited in claim 3, further comprising date-identifying indicia identifying a period of time during which the dosimeter device should be worn.

6. A dosimeter device as recited in claim 1, further comprising name-identifying indicia identifying who should wear the dosimeter device.

7. A dosimeter device wearable on the human body to indicate exposure to radiation, said device comprising: a flat member bendable along at least one line to divide said flat member into at least two panels; and a radiation sensitive member on at least one of said panels and sandwiched between said panels when the flat member is folded, said flat member having indicia thereon identifying where on the human body the device should be worn, said indicia comprising an icon representing a human body, and indicia positioned with respect to said icon for identifying where on the human body the dosimeter device should be worn, said device farther comprising monitoring cycle indicia identifying a period of time during which the dosimeter device should be worn.

8. A dosimeter device as recited in claim 7, further comprising monitoring cycle indicia identifying a period of time during which the dosimeter device should be worn.

9. A dosimeter device as recited in claim 8, said monitoring cycle indicia identifying one of four seasons in a year.

10. A dosimeter device as recited in claim 7, further comprising bar-code indicia on an external surface of said dosimeter device.

11. A dosimeter device as recited in claim 9, further comprising date-identifying indicia identifying a period of time during which the dosimeter device should be worn.

12. A dosimeter device as recited in claim 7, further comprising name-identifying indicia identifying who should wear the dosimeter device.

13. A substantially flat dosimeter device wearable on the human body to indicate exposure to radiation, said substantially flat device comprising: a radiation sensitive member within said device for indicating exposure to radiation; and indicia on a substantially flat external surface of said device, said indicia identifying where on the human body the device should be worn, said indicia comprising an icon representing a human body, and indicia positioned with respect to said icon for identifying where on the human body the substantially flat dosimeter device should be worn, said device further comprising monitoring cycle indicia identifying a period of time during which the substantially flat dosimeter device should be worn.

14. A substantially flat dosimeter device as recited in claim 13, further comprising monitoring cycle indicia identifying a period of time during which the dosimeter device should be worn.

15. A substantially flat dosimeter device as recited in claim 14, said monitoring cycle indicia identifying one of four seasons in a year.

16. A substantially flat dosimeter device as recited in claim 13, further comprising bar-code indicia on an external surface of said dosimeter device.

17. A dosimeter device as recited in claim 13, further comprising name-identifying indicia identifying who should wear the dosimeter device.

18. A dosimeter device wearable on the human body to indicate exposure to radiation, said device comprising: a radiation sensitive member within said device for indicating exposure to radiation; indicia on an external surface of said device, said indicia identifying where on the human body the device should be worn; and monitoring cycle indicia identifying a period of time during which the dosimeter device should be worn, said monitoring cycle indicia identifying one of four seasons in a year.

19. A dosimeter device as recited in claim 18, further comprising date-identifying indicia identifying a period of time during which the dosimeter device should be worn.

20. A dosimeter device wearable on the human body to indicate exposure to radiation, said device comprising: a radiation sensitive member within said device for indicating exposure to radiation; monitoring cycle indicia on an external surface of said device, said monitoring cycle indicia identifying a period of time during which the dosimeter device should be worn and identifying one of four seasons in a year.

21. A dosimeter device wearable on the human body to indicate exposure to radiation, said device comprising: a flat member bendable along at least one line to divide said flat member into at least two panels; a radiation sensitive member on at least one of said panels and sandwiched between said panels when the flat member is folded, said flat member having indicia thereon identifying where on the human body the device should be worn; and monitoring cycle indicia identifying a period of time during which the dosimeter device should be worn, said monitoring cycle indicia identifying one of four seasons in a year.

22. A dosimeter device as recited in claim 21, further comprising date-identifying indicia identifying a period of time during which the dosimeter device should be worn.

23. A dosimeter device wearable on the human body to indicate exposure to radiation, said device comprising: a flat member bendable along at least one line to divide said flat member into at least two panels; a radiation sensitive member on at least one of said panels and sandwiched between said panels when the flat member is folded, said flat member having monitoring cycle indicia thereon identifying a period of time during which the dosimeter device should be worn, said monitoring cycle indicia identifying one of four seasons in a year.

24. A substantially flat dosimeter device wearable on the human body to indicate exposure to radiation, said substantially flat device comprising: a radiation sensitive member within said device for indicating exposure to radiation; indicia on a substantially flat external surface of said device, said indicia identifying where on the human body the device should be worn; and monitoring cycle indicia identifying a period of time during which the dosimeter device should be worn, said monitoring cycle indicia identifying one of four seasons in a year.

25. A dosimeter device as recited in claim 24, further comprising date-identifying indicia identifying a period of time during which the dosimeter device should be worn.

26. A substantially flat dosimeter device wearable on the human body to indicate exposure to radiation, said substantially flat device comprising: a radiation sensitive member within said device for indicating exposure to radiation; monitoring cycle indicia on a substantially flat external surface of said device, said monitoring cycle indicia identifying a period of time during which the dosimeter device should be worn and identifying one of four seasons in a year.

* * * * *